US012053784B2

(12) United States Patent
Grossrieder et al.

(10) Patent No.: US 12,053,784 B2
(45) Date of Patent: Aug. 6, 2024

(54) POWDER PROCESSING APPARATUS INCLUDING A LOADING AND UNLOADING SYSTEM

(71) Applicant: FREWITT FABRIQUE DE MACHINES SA, Granges-Paccot (CH)

(72) Inventors: Yves Grossrieder, Russy (CH); Antoine Virdis, Ferpicloz (CH)

(73) Assignee: FREWITT FABRIQUE DE MACHINES SA, Granges-Paccot (CH)

( * ) Notice: Subject to any disclaimer, the term of this patent is extended or adjusted under 35 U.S.C. 154(b) by 157 days.

(21) Appl. No.: 17/645,342

(22) Filed: Dec. 21, 2021

(65) Prior Publication Data

US 2022/0193688 A1 Jun. 23, 2022

(30) Foreign Application Priority Data

Dec. 22, 2020 (EP) .................................... 20216703

(51) Int. Cl.
*B02C 18/00* (2006.01)
*B02C 18/06* (2006.01)
*B02C 18/22* (2006.01)

(52) U.S. Cl.
CPC ........ *B02C 18/067* (2013.01); *B02C 18/2216* (2013.01); *B02C 18/2225* (2013.01)

(58) Field of Classification Search
CPC ....... B02C 18/067; B02C 13/26; B02C 13/13; B02C 13/10; B02C 13/30; B02C 13/286
USPC ................................ 241/30, 285.3, 181, 183
See application file for complete search history.

(56) References Cited

U.S. PATENT DOCUMENTS

| | | | | |
|---|---|---|---|---|
| 3,419,223 A * | 12/1968 | Morin | B02C 18/144 | 241/73 |
| 8,790,002 B2 * | 7/2014 | Lee | B01F 27/1125 | 366/201 |
| 2012/0287747 A1 * | 11/2012 | Lee | B01F 27/0724 | 366/209 |
| 2015/0253131 A1 * | 9/2015 | Webster | B02C 4/02 | 241/101.3 |

(Continued)

FOREIGN PATENT DOCUMENTS

| | | | | |
|---|---|---|---|---|
| CN | 206139267 U * | 5/2017 | B02C 18/06 |
| CN | 206139267 U | 5/2017 | |
| CN | 109513496 A * | 3/2019 | B02C 18/06 |

(Continued)

*Primary Examiner* — Faye Francis
(74) *Attorney, Agent, or Firm* — Pearne & Gordon LLP

(57) ABSTRACT

A powder processing apparatus comprising a processing head functionally fixed to a driving unit via a fixation device. The processing head comprises an inlet connecting unit configured to be connected to an input container containing the material to be processed and an outlet connecting unit configured to be connected to an output container destined to receive the processed material. The fixation device comprises a pivoting element configured to rotate the processing head around a pivoting axis by a rotation angle between a first angular position where the material contained in the input container can be inputted in the processing head and where the processed material can be outputted in the output container, and a second angular position where the input container being on a base can be connected to the inlet connecting unit. Also disclosed is a method of using the powder processing apparatus.

15 Claims, 7 Drawing Sheets

(56) References Cited

U.S. PATENT DOCUMENTS

2017/0348698 A1* 12/2017 Virdis .................. B02C 13/286

FOREIGN PATENT DOCUMENTS

| | | | | | |
|---|---|---|---|---|---|
| CN | 109530043 | A | * | 3/2019 | ........... B02C 18/145 |
| CN | 214599670 | U | | 11/2021 | |
| JP | 6849997 | B2 | * | 3/2021 | ................ B02F 9/02 |
| WO | 2016098017 | A1 | | 6/2016 | |

* cited by examiner

POWDER PROCESSING APPARATUS INCLUDING A LOADING AND UNLOADING SYSTEM

TECHNICAL DOMAIN

The present disclosure concerns a powder processing apparatus for performing a powder processing operation that includes a loading and unloading system and allows for simplified loading of the material to be processed and unloading of the processed material. The present disclosure further concerns a method of using the powder processing apparatus and a computer program comprising instructions for implementing the method.

RELATED ART

According to existing solutions, the problem of lifting a drum or any container to fill a powder processing apparatus with a material to be processed is solved by using an auxiliary lifting device such as a lifting column. The drum is then clamped to the lifting device, raised up and maintained over the powder processing apparatus. After opening a valve, such as a butterfly valve, the material to be milled can then be poured into the powder processing apparatus.

Such an operation is both time and space consuming as it requires to bring an auxiliary cumbersome lifting device. Moreover, the docking of the drum against the powder processing apparatus is particularly delicate as the involved weights can be rather important. Therefore, this operation often requires one person commanding the lifting device and another one controlling the docking of the drum against the powder processing apparatus.

SUMMARY

The present disclosure concerns a powder processing apparatus comprising a processing head configured to process a material and to be removably and functionally fixed to a driving unit via a fixation device extending between the driving unit and the processing head, the processing head being at a distance from a base when connected to the driving unit. The processing head comprises an inlet connecting unit configured to be connected to an input container containing the material to be processed and an outlet connecting unit configured to be connected to an output container destined to receive the processed material. The fixation device comprises a pivoting element configured to rotate the processing head around a pivoting axis by a rotation angle between a first angular position where the material contained in the input container can be inputted in a processing head and where the processed material can be outputted in the output container, and a second angular position where the input container being on the base can be connected to the inlet connecting unit.

The present disclosure further concerns a method of using the powder processing apparatus and comprising the steps of

- pivoting the processing head in the second angular position;
- connecting an input container to the inlet connecting unit;
- pivoting the processing head with the attached input container in the first angular position;
- connecting an output container to the outlet connecting unit; and
- performing the powder processing operation.

A computer program comprising instructions for implementing the method is also disclosed.

The powder processing apparatus disclosed herein allows for loading the material to be processed in the processing head and unloading the processed material from the processing head without using an auxiliary device such as a separate lifting column and/or clamping elements. The surface area needed to load and use the powder processing apparatus can be reduced. The complexity of the manipulation steps required in loading and operating the powder processing apparatus is also reduced. In particular, the steps of lifting and attaching the containers to the processing head can be performed by a single person instead of two in the existing solutions. Careful centring of the container is also not needed.

Moreover, the powder processing apparatus disclosed herein allows for using containers that do not include a discharge valve to prevent the material from emptying when the container is turned over.

SHORT DESCRIPTION OF THE DRAWINGS

Exemplar embodiments of the invention are disclosed in the description and illustrated by the drawings in which.

Figure 3A:
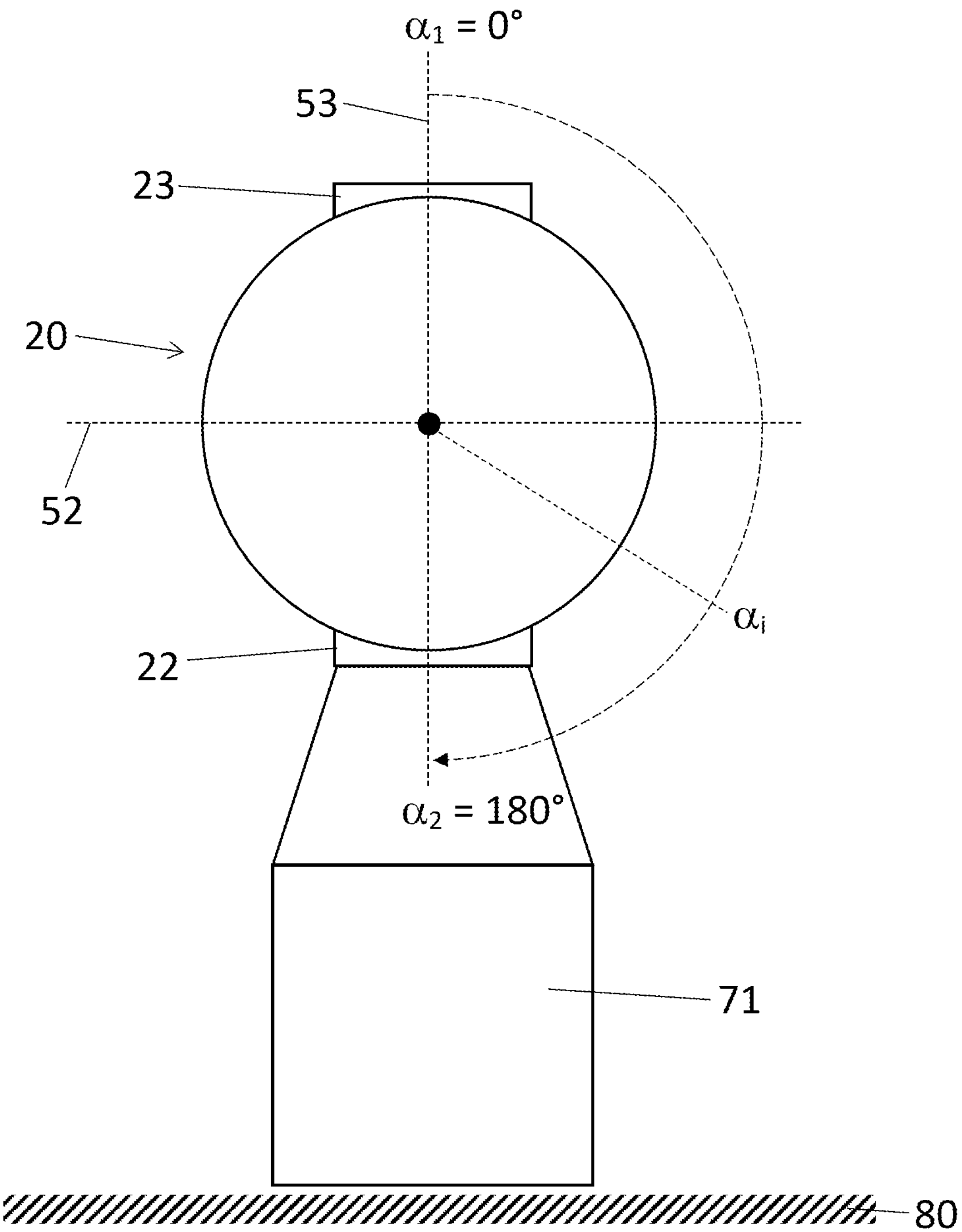
Figure 3B:
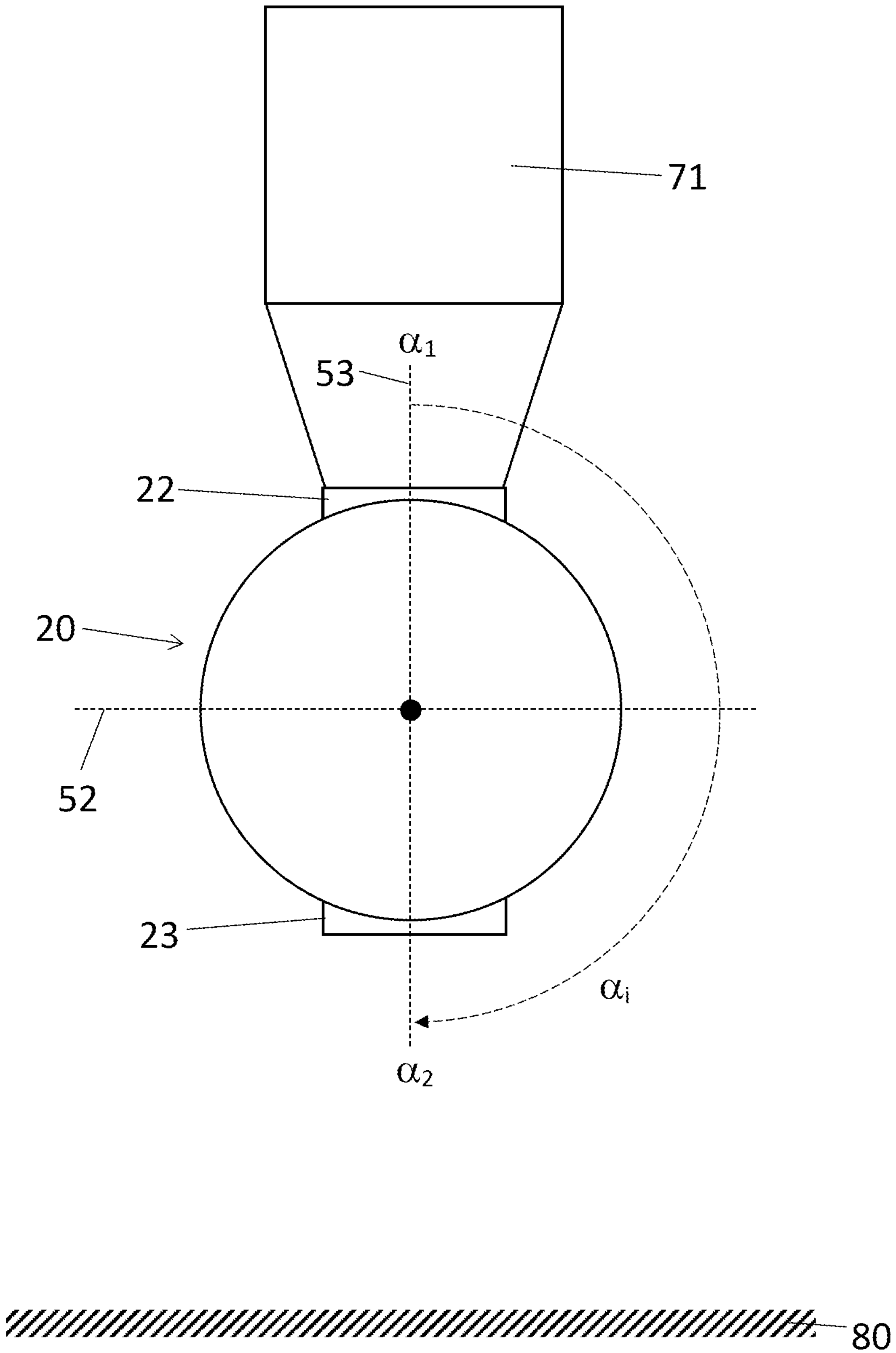
Figure 3C:
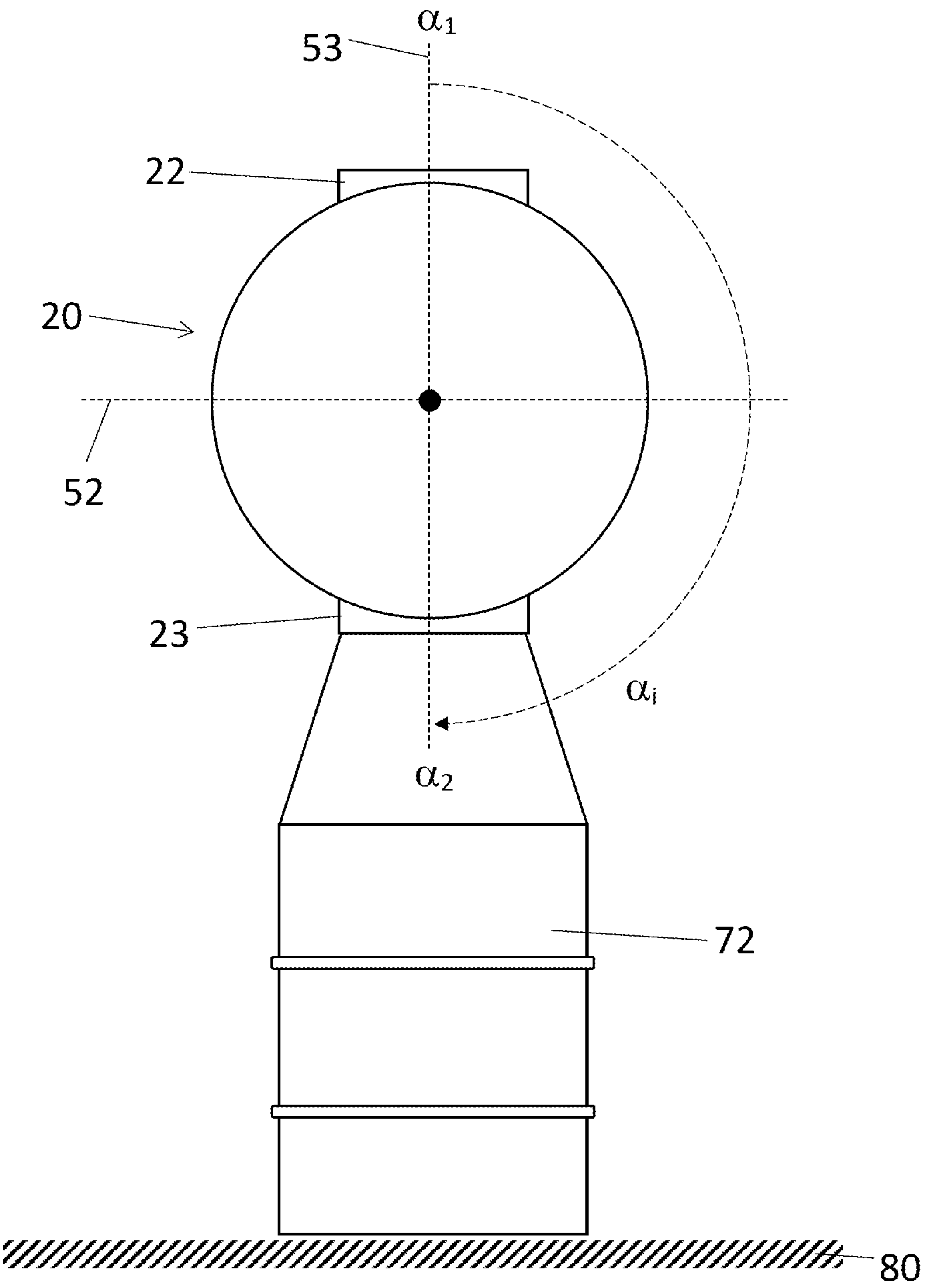
Figure 4:
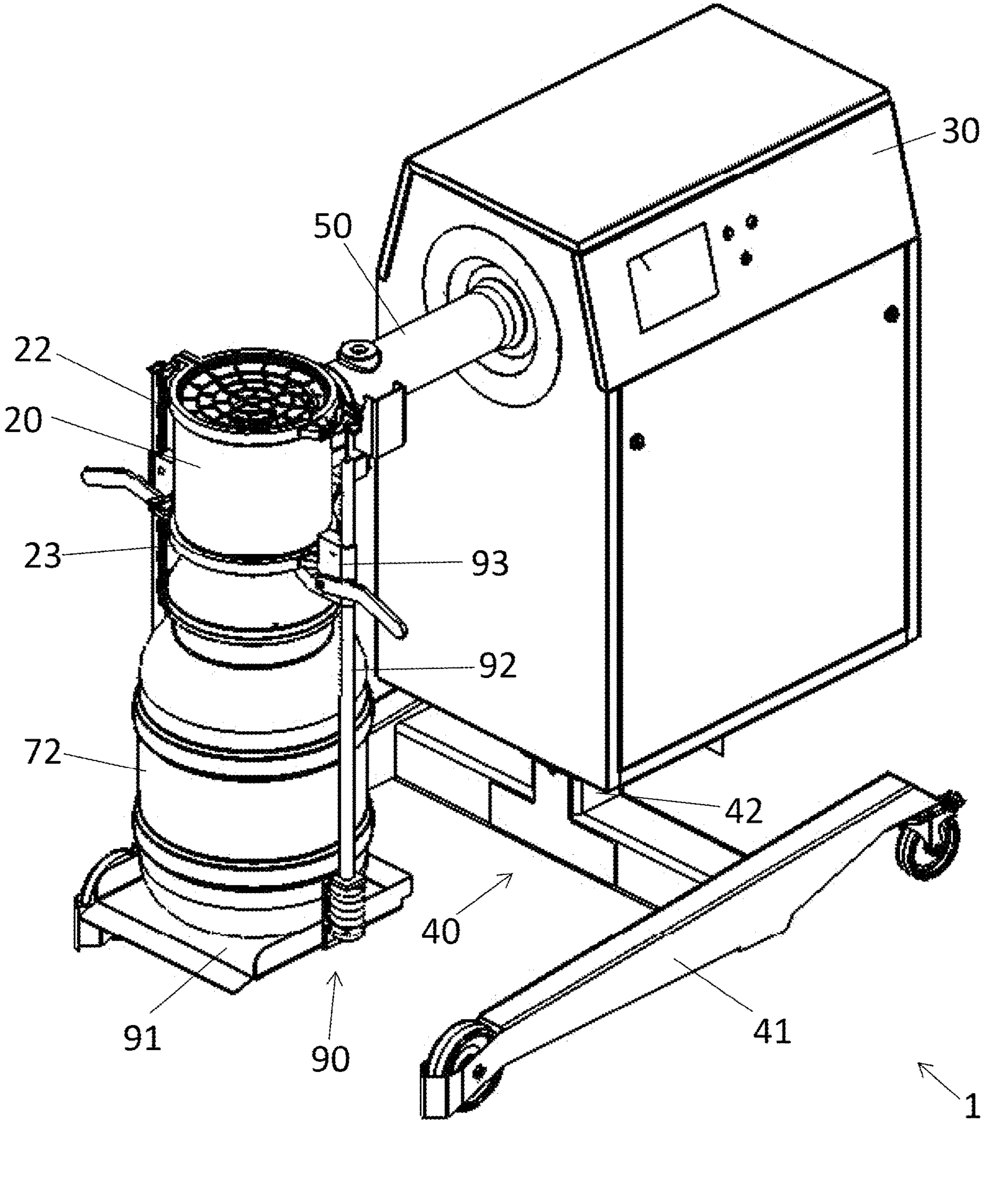
Figure 5:
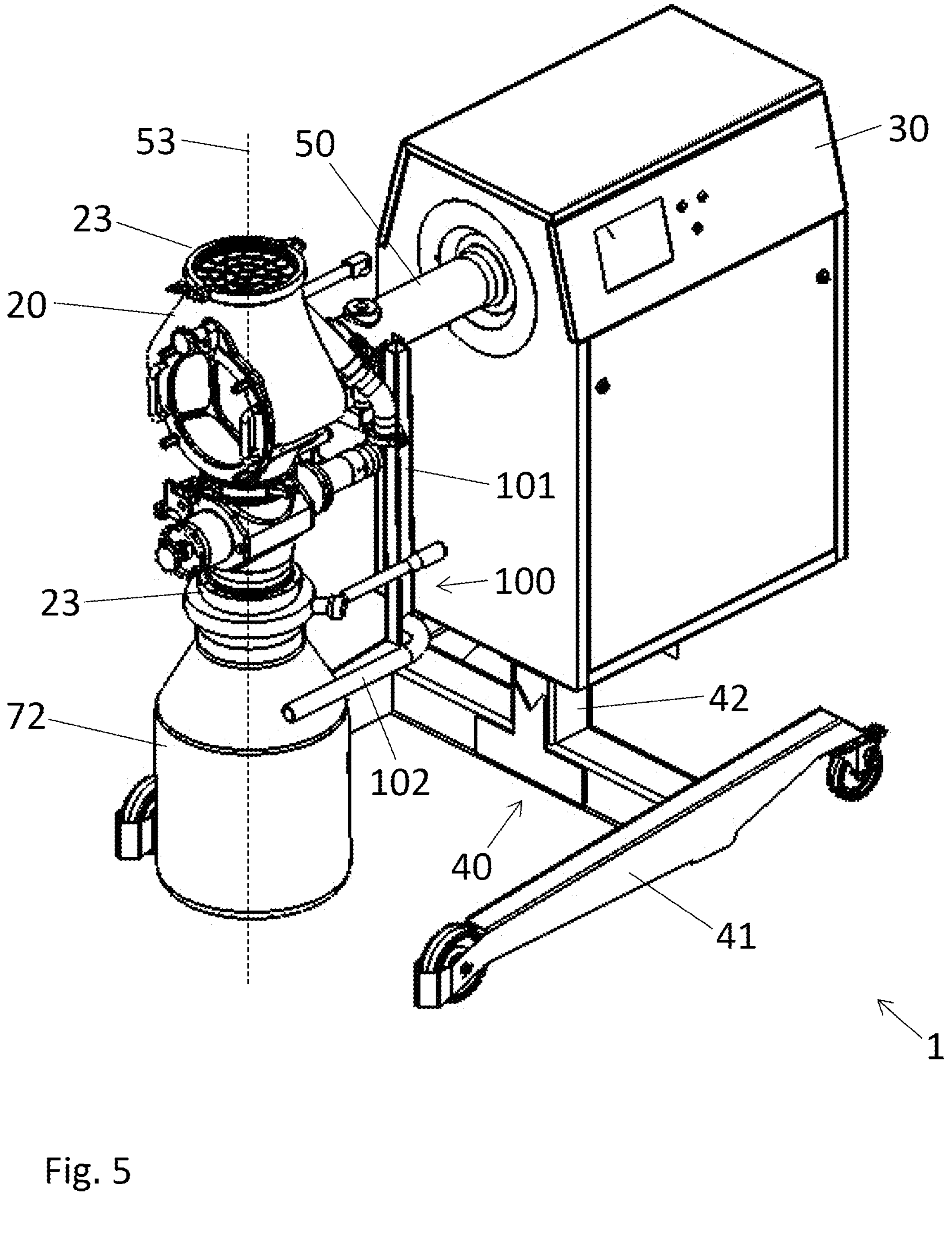

FIGS. 3*a* to 3*c* illustrate a method of using the powder processing apparatus including the steps of pivoting the processing head in a second angular position (FIG. 3*a*), pivoting the processing head with an attached input container in a first angular position (FIG. 3*b*), and transferring the processed material from the processing head to an output container (FIG. 3*c*);

FIG. 4 shows the powder processing apparatus comprising a connecting device, according to an embodiment; and FIG. 5 illustrates the powder processing apparatus comprising a container supporting device, according to an embodiment.

EXAMPLES OF EMBODIMENTS

Figure 1:
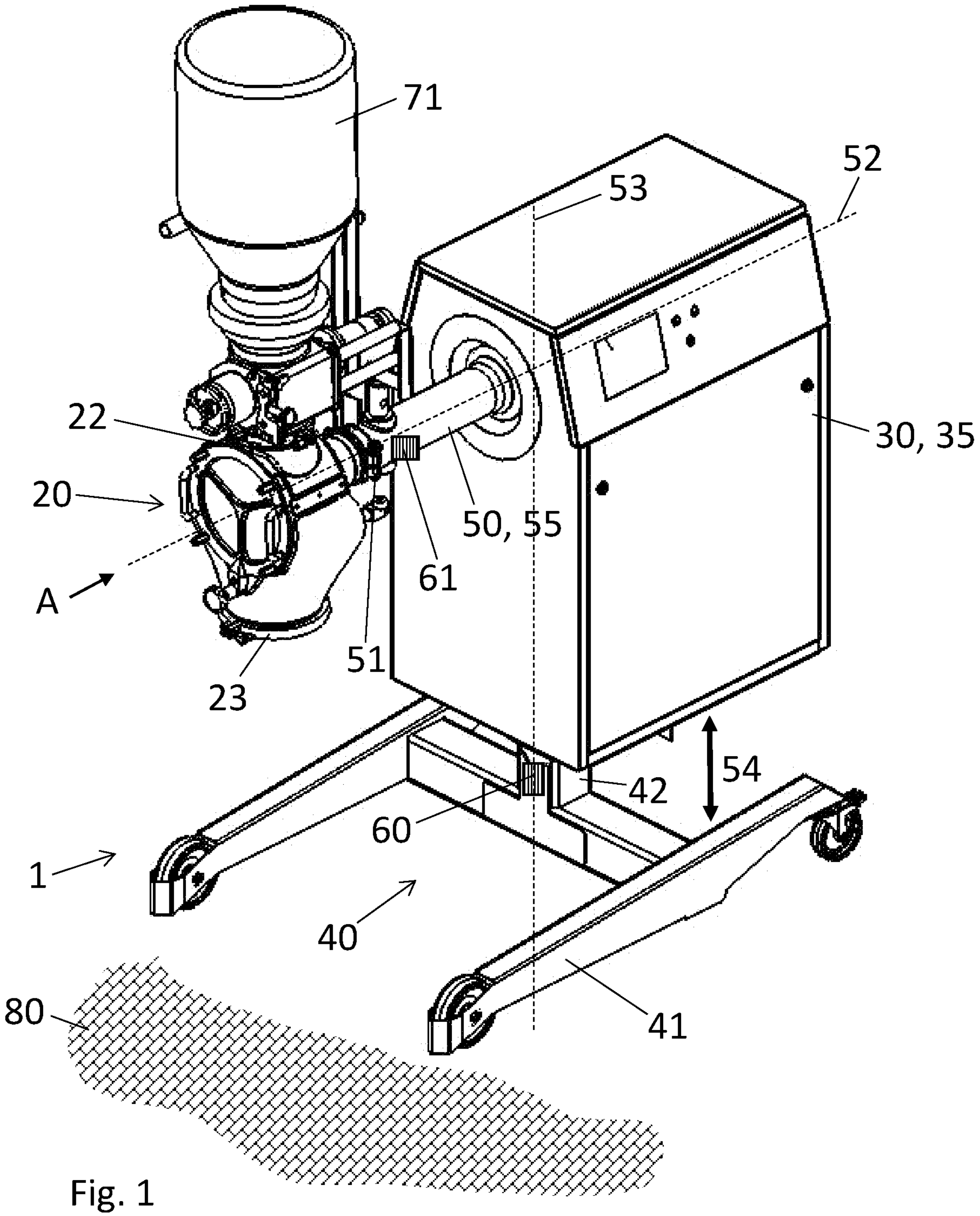
FIG. 1 illustrates schematically a powder processing apparatus comprising a processing head and a driving unit, according to an embodiment.

FIG. 1 illustrates a powder processing apparatus 1 according to an embodiment. The powder processing apparatus 1 comprises a processing head 20 configured to process a material (powder or bulk material to be reduced to powder). The processing head 20 is configured to be removably and functionally fixed to a driving unit 30 via a fixation device 50 extending between the driving unit 30 and the processing head 20. In the example of FIG. 1, the fixation device 50 is configured as an arm extending between the driving unit 30 and the processing head 20. When connected to the driving unit 30, the processing head 20 is at a distance from a base 80. For example, the processing head 20 is above the ground 80 on which lay the powder processing apparatus 1.

Figure 2:
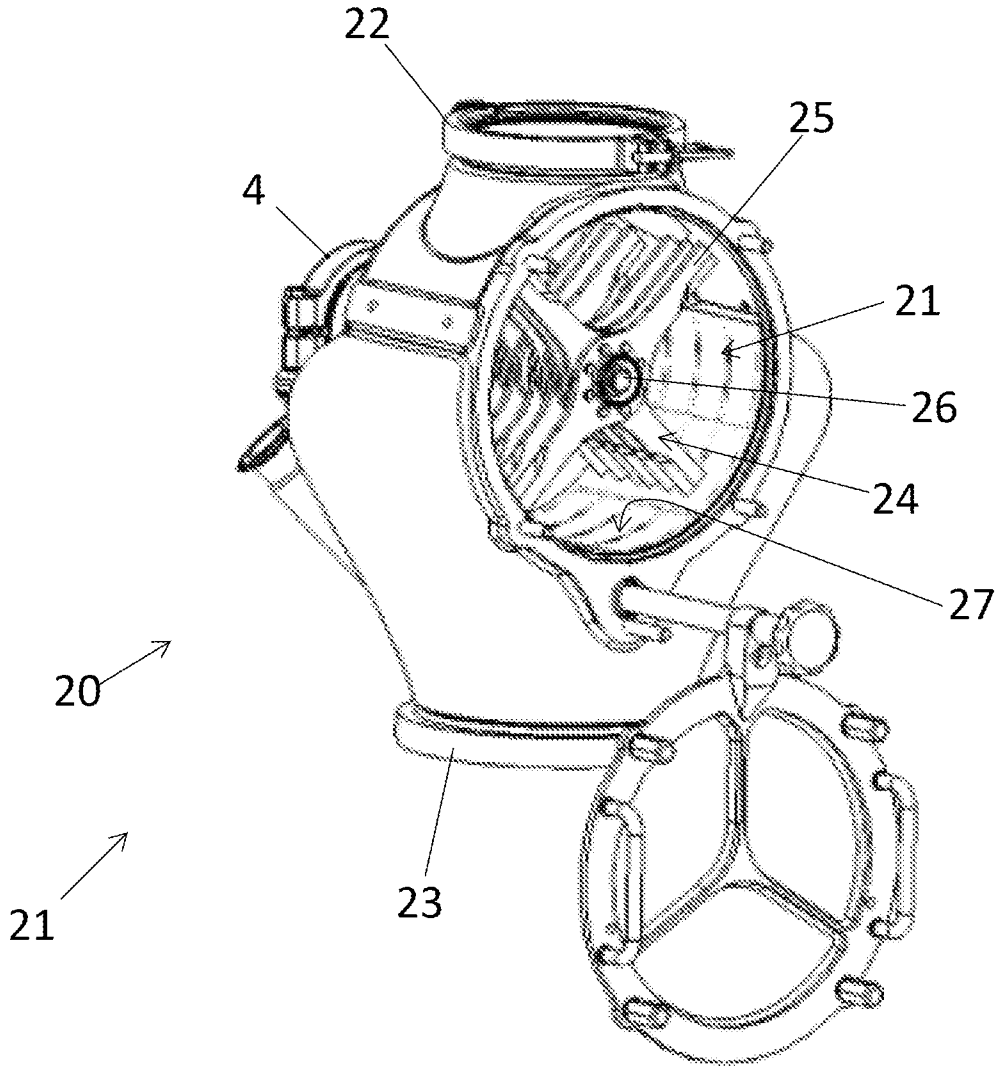
FIG. 2 shows an isolated view of an example of a processing head, according to an embodiment.

FIG. 2 shows an isolated view of the processing head 20 comprising a milling head, according to an exemplary configuration. As illustrated, the milling head 20 can comprise a milling chamber 21 including a rotor assembly 24 rotationally mounted around a rotor axis 26 and a sieve assembly 27. In the example of FIG. 2, the sieve assembly 27 has a cylindrical shape that can be arranged coaxial with the rotor axis 26 in the milling chamber 21. The rotor assembly 26 can include one or a plurality of blades 25, for example extending radially from the rotor axis 26. The rotor assembly 24 is drivingly connected to the driving unit 30 when the milling head 20 is functionally fixed to the driving unit 30. The processing head 20 is not limited to the exemplary milling head shown in FIG. 2. Indeed, the processing head 20 can comprise any type of processing head configured to perform a powder processing operation such any type of milling, powder size reduction, de-agglomeration, pulverizing, homogenizing, sizing, crushing, conveying, powder handling, dosing, mixing, etc.

In one aspect, the processing head 20 comprises an inlet connecting unit 22 configured to be connected to an input container 71 (see FIG. 3*a*) containing the material to be processed. The processing head 20 further comprises an outlet connecting unit 23, configured to be connected to an output container 72 (see FIG. 3*c*) destined to receive the processed material. The inlet and outlet connecting units 22, 23 may comprise a barrel, industrial bag, a funnel, a sleeve, or any other suitable container or accessory.

In a non-limiting example, the inlet and/or outlet connecting units 22, 23 comprise a tri-clamp connection.

In one aspect, the fixation device 50 comprises a pivoting element 51 configured to rotate the processing head 2 by a rotation angle $\alpha_i$ around a pivoting axis 52 substantially coaxial with the fixation device 50. In particular, the pivoting element 51 is configured to rotate the processing head 2 around the pivoting axis 52 by between a first angular position $\alpha_1$ (see FIGS. 3*a* to 3*c*) where the material contained in the input container can be inputted in the processing head 20 and where the processed material can be outputted in the output container (during and/or after the powder processing operation), and a second angular position $\alpha_2$ where the input container being on the base 80 (for example on the ground) can be connected to the inlet connecting unit 22 (prior to the powder processing operation).

According to an embodiment, a method of using the powder processing apparatus 1 is represented in FIGS. 3*a* to 3*c*. More particularly, FIGS. 3*a* to 3*c* illustrate a schematic front view (viewed from A in FIG. 1) of the processing head 20 showing the first and second angular position $\alpha_1$, $\alpha_2$. The method comprises the steps of:

- pivoting the processing head 20 in the second angular position $\alpha_2$ (FIG. 3*a*);
- connecting an input container 71 (being on the base 80) to the inlet connecting unit 22;
- pivoting the processing head 20 with the attached input container 71 in the first angular position $\alpha_1$ (FIG. 3*b*);
- connecting an output container 72 (being on the base 80) to the outlet connecting unit 23; (FIG. 3*c*); and
- performing the powder processing operation.

During the step of performing the powder processing operation, the processed material can be transferred from the processing head 20 to the output container 72. Transferring the processed material can be performed simultaneously or sequentially with the step of performing the powder processing operation. In the case where the processing head 20 is a milling head such as illustrated in FIG. 2, the driving unit 30 can rotate the rotor assembly 24 relative to the sieve assembly 27 such as to mill the material contained in the milling chamber 21.

Transferring the material to be processed from the input container 71 to the processing head 20 and transferring the processed material from the processing head 20 to the output container 72 can be performed by gravity or by suitable means, possibly including a dosing unit, a valve unit or a gas flow under over or under pressure.

In some aspects, the step of connecting an output container 72 to the outlet connecting unit 23 can be performed prior to performing the powder processing operation. The step of connecting an output container 72 to the outlet connecting unit 23 can further be performed prior to the step of pivoting the processing head 20 in the second angular position $\alpha_2$. In the latter case, the output container 72 can be connected to the processing head 20 prior to connecting the input container 71. The input container 71 can be filled with a material to be processed prior to being connected to the processing head 20.

When the processing head 20 is pivoted in the second angular position $\alpha_2$, the input container 71 can be arranged to be facing the inlet connecting unit 22 such that it can be connected to the latter. Similarly, the output container 72 can be arranged to be facing the outlet connecting unit 23.

In a preferred configuration, the rotation angle $\alpha_i$ is at least 160° or at least 180°. For example, the first and second angular positions $\alpha_1$, $\alpha_2$ can correspond to the processing head 20 being oriented substantially along a vertical direction 53 substantially perpendicular to the pivoting axis 52 (see FIG. 3*a*), such that the processing head 20 is in a position to perform the powder processing operation (first angular positions $\alpha_1$=0°), or aligned with the input container 71 to be attached (second angular positions $\alpha_2$=180°). Other angular positions can be contemplated. For example, the first and second angular positions $\alpha_1$, $\alpha_2$ can correspond to an angle whereby the processing head 20 is inclined relative to the vertical direction 53.

The processing head 20 is pivoted by the pivoting element 51. Pivoting the processing head 20 can be performed manually. Alternatively, the rotation of the processing head 20 can be driven by using a head driving unit 35 independent of the driving unit 30.

In one aspect, the inlet connecting unit 22 and/or the outlet connecting unit 23 can comprise locking connection, such as a tri-clamp connection, allowing to connect the input and/or output container 71, 72 in a secured fashion. Other configurations of the inlet and outlet connecting units 22, 23 can however be contemplated.

FIG. 4 shows the powder processing apparatus 1 according to another embodiment. The powder processing apparatus 1 comprises a connecting device 90 configured to connect the input container 71 to the inlet connecting unit 22 and/or the output container 72 to the outlet connecting unit 23 in a secured fashion without requiring a locking connection. In the exemplary embodiment of FIG. 4, the connecting device 90 comprises a connecting plate 91 is configured to receive the input and/or output container 71, 72. The connecting plate 91 cooperates with a spring-loaded shaft 92 (two spring-loaded shafts in FIG. 4) such as to press the input and/or output container 71, 72 against the inlet and/or outlet connecting unit 22, 23 respectively. The spring-loaded shaft 92 can be arranged slidingly in a bushing 93 fixed relative to the processing head 20.

In another aspect shown in FIG. 5, the powder processing apparatus 1 comprises a container supporting device 100 configured to support the input and/or output container 71, 72 relative to the vertical direction 53. The container supporting device 100 allows for resisting lateral loads acting on the input and/or output container 71, 72 connected to the processing head 20. In the exemplary embodiment of FIG. 5, the container supporting device 100 comprises a column 101 fixed to the fixation device 50 and a supporting arm 102 fixed to the column 101. The container supporting device 100 can comprise two or more supporting arms 102. The single or plurality of supporting arms 102 support the input and/or output container 71, 72 relative to the vertical direction 53 (support the input and/or output container 71, 72 laterally relative to the processing head 20) when the latter is connected to the processing head 20.

In an embodiment, the powder processing apparatus 1 can comprise an optional supporting structure 40 (see FIG. 1) supporting the driving unit 30 above the base 80 (or ground). The supporting structure 40 can being configured to move the driving unit 30 substantially along the vertical direction 53.

In one aspect, the supporting structure 40 can comprise a lifting column 42 configured to control the movement of the driving unit 30 up and down along the vertical direction 53 (shown by the double arrow 54 in FIG. 1) to a predetermined position. The lifting column 42 can comprise a linear actuator (not shown) or any other actuator device suitable to control the movement of the driving unit 30 along the vertical direction 53. The linear actuator may refer to an electric, pneumatic, hydraulic, electro-hydraulic or mechanical device that generates the movement 54 along the vertical direction 53. The supporting structure can further comprise a supporting base 41 supporting the lifting column 42.

The lifting column 42 can be used to adjust the distance between the input container 71 and the inlet connecting unit 21 when the input container 71 is on the base 80 and when the processing head is in the second angular position $\alpha_2$. The lifting column 42 can be further used to adjust the distance between the output container 72 and the outlet connecting unit 23 when the output container 72 is on the base 80 and when the processing head is in the first angular position $\alpha_1$. For example, the lifting column 42 can move the driving unit 30 and the processing head 20 turned in the second angular position $\alpha_2$ down towards the input container 71 to attach the latter to the processing head 20. After attaching the input container 71 to the processing head 20, the lifting column 42 can move the driving unit 30 upwards prior to turning the processing head 20 (with the input container 71 attached) in the first angular position $\alpha_1$.

The lifting column 42 can be controlled manually or in an automated fashion such as by using a pneumatic or electric actuator.

In an embodiment, the lifting column 42 comprises a lifting sensor 60 (see FIG. 1) configured to provide a linear position signal associated with the movement 54 of the lifting column 42. The lifting sensor 60 may comprise position sensor, for example located in the processing head 20 or in the lifting column 42. The lifting sensor 60 may further comprise a displacement transducer that is adapted to measure the extension of the lifting column 42 and to transmit the linear position signal indicative of the extension of the lifting column 42. The lifting sensor 60 may further comprise an elevation sensor that is adapted to measure an elevation of the processing head 20 relative to a fixed point, for example the base 80 or the supporting base 41 of the supporting structure 40 and provide a corresponding linear position signal.

The linear position signal can be used to control the movement 54 of the lifting column 42 as a function of a distance with respect to the processing head 20 and the input container 71 and/or output container 72, when the latter is disposed underneath the processing head 20. For example, the linear position signal can be used to control the movement 54 of the lifting column 42 as a function of a distance with respect to the inlet connecting unit 22 and the input container 71 and/or the outlet connecting unit 23 and the output container 72. In one aspect, the lifting sensor 60 is configured to stop the movement 54 of the lifting column 42 when the inlet connecting unit 22 and/or the outlet connecting unit 23 is at a predetermined distance of, respectively, the input container 71 and output container 72.

Alternatively or in addition to the lifting sensor 60, the powder processing apparatus 1 can comprise a rotation sensor 61 configured to measure the rotation angle $\alpha_i$ (angular position) of the processing head 20. An angular position signal generated by the rotation sensor 61 can be used to limit the rotation angle $\alpha_i$ of the processing head 20. The rotation sensor 61 can be further configured to cooperate with a head driving unit 35 driving the processing head 20 in rotation. In the latter configuration, the rotation angle $\alpha_i$ of the processing head 20 can be controlled. More particularly, the first and second angular positions $\alpha_1$, $\alpha_2$ can be defined in an automated fashion. Moreover, the rotation sensor 61 can be used to define an intermediate angle $\alpha_i$ (see FIG. 3*a*), for example an intermediate angle of 45°, allowing to perform an operation other than a powder processing operation, such as visual inspection or cleaning of the processing head 20.

In an embodiment, the method of using the powder processing apparatus 1 comprises the step of, prior to turning the processing head 20 in the second angular position $\alpha_2$, controlling the lifting column 42 to move the processing head 20 in a first predetermined position (for example downwards to a predetermined distance between the processing head 20 and the input container 71). The method can further comprise the step of, prior to pivoting the processing head 20 with the attached input container 71 in the first angular position $\alpha_1$, controlling the lifting column 42 to move the processing head 20 in a second predetermined position (for example upwards). The method can further comprise the step of, prior to connecting an output container 72 to the outlet connecting unit 23, controlling the lifting column 42 to move the processing head 20 in a third predetermined position (for example downwards to a predetermined distance between the processing head 20 and the output container 72).

The steps of pivoting the processing head 20 and of controlling the lifting column 42 can be performed in combination, in a coordinated fashion.

In some aspects, the fixation device 50 can comprise a "foolproof" device 55 configured to only allow fixing to the driving unit 30 processing heads 20 that are suitable for the rotation by the pivoting element 51. The foolproof device 55 can comprise a foolproof notch (not shown) provided on the fixation device 50 and/or on the processing head 20.

In one aspect, the supporting base 41 can be configured with an asymmetrical design preventing a collision between the container 71, 72 and the supporting structure 40 during the rotation of the processing head 20.

In an embodiment, a computer program comprising instructions for implementing the method comprising the steps of: pivoting the processing head 20 in the second angular position $\alpha_2$; connecting an input container 71 to the inlet connecting unit 22; pivoting the processing head 20 with the attached input container 71 in the first angular position $\alpha_1$; connecting an output container 72 to the outlet connecting unit 23; and performing the powder processing operation. During (or after) the step of performing the powder processing operation, the processed material can be transferred from the processing head 20 to the output container 72.

In one aspect, the steps of: connecting an input container 71 to the inlet connecting unit 22; and connecting an output container 72 to the outlet connecting unit 23 can be performed manually.

In an embodiment, the computer program can be further configured to executing any one alone or in combination, of the steps: prior to turning the processing head 20 in the second angular position $\alpha_2$, controlling the lifting column 42 to move the driving unit 30 in a first predetermined position; prior to pivoting the processing head 20 with the attached input container 71 in the first angular position $\alpha_1$, controlling the lifting column 42 to move the driving unit 30 in a second predetermined position; and prior to connecting an output container 72 to the outlet connecting unit 23, controlling the lifting column 42 to move the driving unit 30 in a third predetermined position.

The computer program can be further configured to include a step of entering by a user of information parameters, such as the dimensions (such as height and diameter) of the input container 71 and/or output container 72.

LIST OF REFERENCE NUMERALS

1 powder processing apparatus
20 processing head
21 processing chamber
22 inlet connecting unit
23 outlet connecting unit
24 rotor assembly
25 blade
26 rotor axis
27 sieve assembly
30 driving unit
35 head driving unit
40 supporting structure
41 supporting base
42 lifting column
50 fixation device
51 pivoting element
52 pivoting axis
53 vertical direction
54 movement of the lifting column
55 foolproof device
60 lifting sensor
61 rotation sensor
71 input container
72 output container
80 base
90 connecting device
91 connecting plate
92 spring-loaded shaft
93 bushing
100 container supporting device
101 column
102 supporting arm
$\alpha_i$ rotation angle
$\alpha_1$ first angular position
$\alpha_2$ second angular position

The invention claimed is:

1. A powder processing apparatus for performing a powder processing operation, comprising:
- a processing head configured to process a material and to be removably and functionally fixed to a driving unit via a fixation device extending between the driving unit and the processing head, the processing head being at a distance from a base when connected to the driving unit
- wherein the processing head comprises:
  - an inlet connecting unit configured to be connected to an input container containing the material to be processed, and
  - an outlet connecting unit configured to be connected to an output container destined to receive the processed material, and
- wherein the fixation device comprises:
  - a pivoting element configured to rotate the processing head around a pivoting axis by a rotation angle between a first angular position where the material contained in the input container can be inputted in the processing head and where the processed material can be outputted in the output container, and
  - a second angular position where the input container being on the base can be connected to the inlet connecting unit.

2. The apparatus of claim 1, comprising a head driving unit configured to drive the pivoting element in rotation.

3. The apparatus of claim 1, wherein the rotation angle is at least 160° or at least 180°, preferably wherein the first angular position is 0° and the second angular position is 180°, relative to a vertical direction substantially perpendicular to the pivoting axis.

4. The apparatus of claim 1, wherein the pivoting element and/or the processing head comprises a foolproof device configured to allow fixing processing heads that are suitable for the rotation by the pivoting element.

5. The apparatus of claim 1, comprising a rotation sensor configured to measure the rotation angle of the processing head.

6. The apparatus of claim 1, comprising a supporting structure including a lifting column configured to control a movement of the driving unit along a vertical direction substantially perpendicular to the pivoting axis.

7. The apparatus of claim 6, comprising a lifting sensor configured to provide a linear position signal associated with the movement of the lifting column.

8. The apparatus of claim 6, comprising a head driving unit configured to drive the pivoting element in rotation and to control the pivoting of the processing head and the movement of the lifting column in a coordinated fashion.

9. The apparatus of claim 1, comprising a connecting device configured to connect the input container to the inlet connecting unit and/or the output container to the outlet connecting unit in a secured fashion without requiring a locking connection.

10. The apparatus of claim 1, comprises a container supporting device configured to support the input and/or output container laterally relative to the processing head.

11. A method of using a powder processing apparatus, comprising a processing head configured to process a material and to be removably and functionally fixed to a driving unit via a fixation device extending between the driving unit and the processing head, the processing head being at a distance from a base when connected to the driving unit; the processing head comprising an inlet connecting unit configured to be connected to an input container containing the material to be processed, and an outlet connecting unit configured to be connected to an output container destined to receive the processed material; wherein the fixation device comprises a pivoting element configured to rotate the processing head around a pivoting axis by a rotation angle between a first angular position where the material contained in the input container can be inputted in the processing head and where the processed material can be outputted in the output container, and a second angular position where the input container being on the base can be connected to the inlet connecting unit, wherein the method comprises:
- pivoting the processing head in the second angular position;

connecting an input container to the inlet connecting unit;

pivoting the processing head with the attached input container in the first angular position;

connecting an output container to the outlet connecting unit; and performing the powder processing operation and transferring the processed material from the processing head to the output container.

12. The method of claim 11, wherein the apparatus comprises a supporting structure including a lifting column controllable to drive a movement of the driving unit along a vertical direction substantially perpendicular to the pivoting axis, the method further comprising:

prior to turning the processing head in the second angular position, controlling the lifting column to move the processing head in a first predetermined position; and prior to pivoting the processing head with the attached input container in the first angular position, controlling the lifting column to move the processing head in a second predetermined position.

13. The method of claim 12, further comprising prior to connecting an output container to the outlet connecting unit, controlling the lifting column to move the processing head in a third predetermined position.

14. The method of claim 11, wherein the steps of pivoting the processing head and controlling the lifting column are performed in combination.

15. A non-transitory computer-readable storage medium comprising a computer program product including instructions to cause at least one processor in the device of claim 1 to execute a method comprising:

pivoting the processing head in the second angular position;

connecting an input container to the inlet connecting unit;

pivoting the processing head with the attached input container in the first angular position;

connecting an output container to the outlet connecting unit; and performing the powder processing operation and transferring the processed material from the processing head to the output container.

* * * * *